US006591666B1

(12) United States Patent
Kacewicz et al.

(10) Patent No.: US 6,591,666 B1
(45) Date of Patent: Jul. 15, 2003

(54) ENGINE MISFIRE DETECTION USING ADJUSTABLE WINDOWING

(75) Inventors: John Michael Kacewicz, Riverview, MI (US); Arthur Joseph Varady, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/173,191

(22) Filed: Oct. 15, 1998

(51) Int. Cl.[7] ............................................. G01M 15/00
(52) U.S. Cl. ..................................................... 73/117.3
(58) Field of Search .............................. 73/116, 117.3, 73/118.2; 123/479

(56) References Cited

U.S. PATENT DOCUMENTS

| | | | | |
|---|---|---|---|---|
| 5,109,695 A | * | 5/1992 | James et al. ................ 73/117.3 |
| 5,497,751 A | * | 3/1996 | Ohtake ........................ 123/479 |
| 5,504,682 A | * | 4/1996 | Shiraishi et al. ............ 73/117.3 |
| 5,508,927 A | * | 4/1996 | Remboski, Jr. et al. .... 73/117.3 |
| 5,821,411 A | * | 10/1998 | Lohmann et al. ............. 73/116 |
| 5,991,685 A | * | 11/1999 | Fukuchi et al. ............ 73/117.3 |

* cited by examiner

*Primary Examiner*—Eric S. McCall
(74) *Attorney, Agent, or Firm*—Artz & Artz, P.C.

(57) ABSTRACT

An engine misfire detection circuit and method for operation includes a reference window generator that generates a misfire window reference signal having a misfire sampling window. A misfire window calculator is coupled to a condition variable input and the reference window generator. The condition varying input may be a filter input or an input from various engine sensors. The misfire window calculator calculates an offset for adjusting the sampling window in response to the condition variable input.

19 Claims, 3 Drawing Sheets

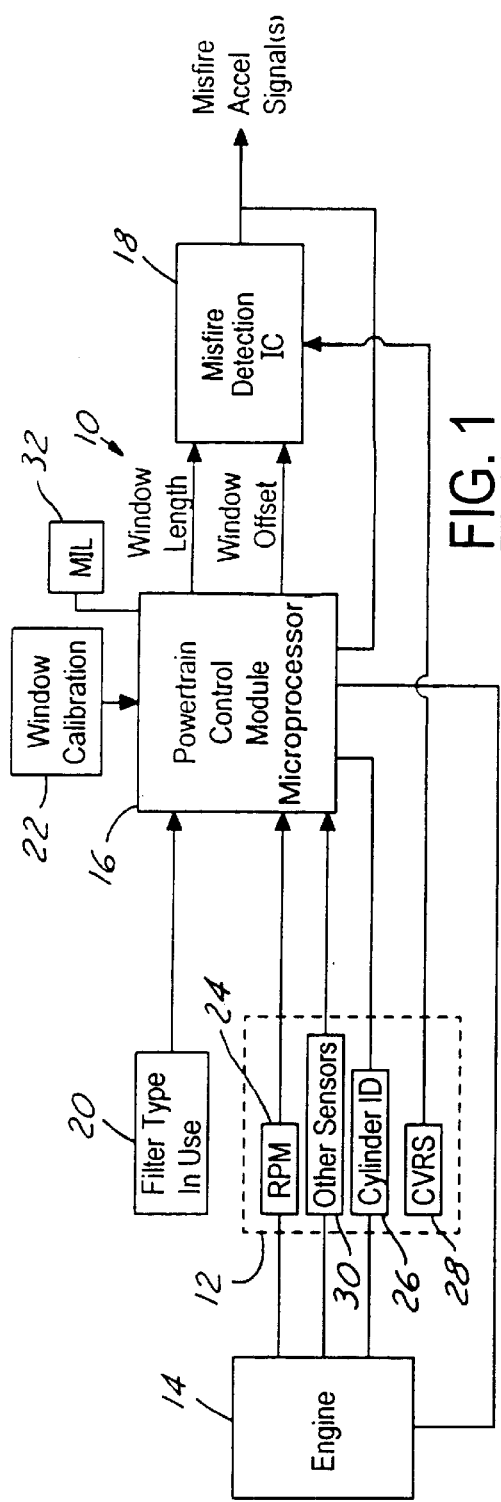
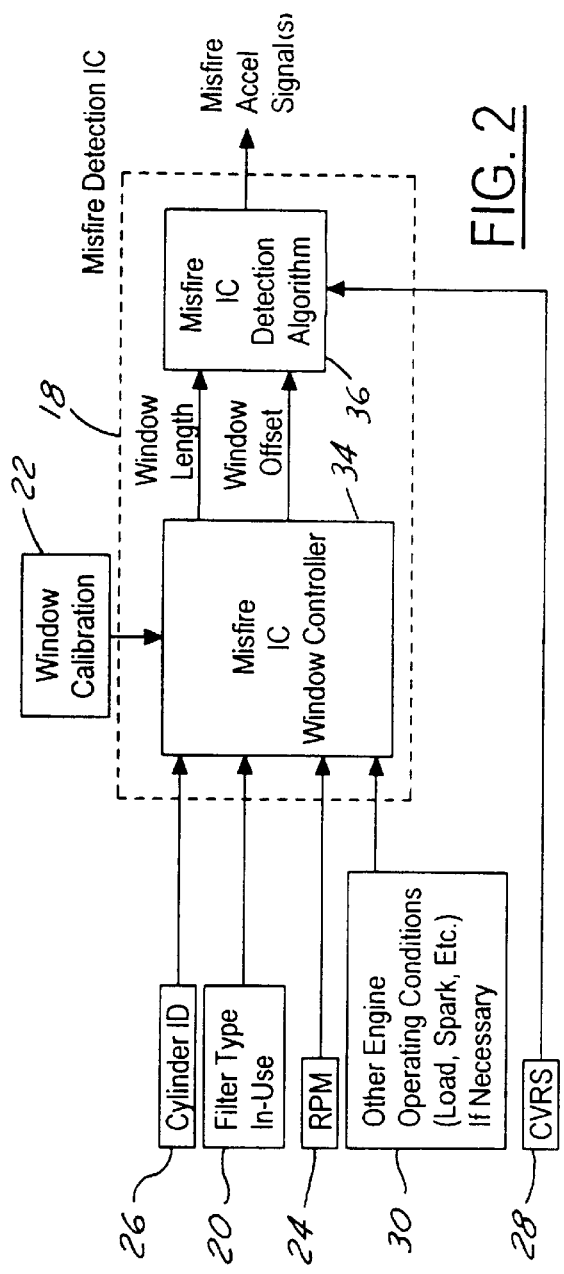
FIG. 1
FIG. 2

ENGINE MISFIRE DETECTION USING ADJUSTABLE WINDOWING

TECHNICAL FIELD

The present invention relates generally to electronic controls for operating an internal combustion engine, and more particularly, to a method and apparatus for detecting a misfiring within a cylinder during operation of the engine.

BACKGROUND OF THE INVENTION

Most automobiles employ a catalytic converter to reduce the amount of pollutants in engine exhaust. Engine misfire occurs when the combustion process is incomplete or does not occur. When a cylinder misfires, unburned fuel escapes into the exhaust system.

State and federal agencies have identified engine misfire as a contributor to vehicle emissions and a cause of poor catalyst performance. They have instituted regulations that require misfire detection systems be implemented in automobile on-board diagnostics to alert drivers (technically through an indicator on the instrument panel) when a misfire measurement rate exceeds a threshold mandated by such agencies.

The aim of the regulations is to determine an accurate measurement of the misfire rate and to alert the driver as soon as possible when a misfire rate exceeds thresholds enumerated in the regulations. There are three important parameters to consider in order to carry out regulations established by the agencies. They are as follows: 1) threshold rate $R_{th}$ (the rate of misfire determined to cause emissions that are too high; 2) time constant (the length of a time "window" over which measurements of the average misfire rate is taken); 3) false alarm rate $R_{fa}$ (frequency of occurrence of normal firings which are incorrectly classified as misfirings) and 4) the rate at which real misfires are incorrectly classified as normal.

In one known misfire detection system, a fixed window is used. The window is the time during which misfire is detected. In the known system, the window is fixed relative to the crank angle. Having a fixed regular occurring window is suitable for many engine applications. However, some engines have firing events at irregular intervals because of the inherent geometry of the crankshaft and engine design. For example, in some "V" block engine designs, one engine bank may have the misfire window centered around the potential misfire event while the other bank may be up to 30 degrees off center from the optimum misfire detection time.

Various filters are also used to process the misfire signal. Commonly, a 0.01 order filter and a 1.0 order filter are used. The 0.01 order filter is used at higher engine speeds and the 1.0 order filter is used at lower engine speeds. Each of these filters, however, has a different phase delay. The different phase delays also account for some shift of the misfire signal with respect to the misfire window. Other engine conditions such as ignition timing and load may also contribute to a misalignment of the misfire signal with respect to the misfire sampling window.

It is important to align the misfire signal with the misfire window so that a proper measurement may be made. Fixed windows, which are calibrated at a fixed width and position relative to the crankshaft angle, occur at evenly spaced intervals. The misfire signal is a measurement of the minimum acceleration value that occurs within the window. That is, the misfire signal is the minimum acceleration value that occurs when the misfire window is "high."

For engine diagnostic applications, it is desirable to track the misfire rate separately for each engine cylinder. Therefore, it would be desirable to provide a method for accurately providing a misfire detection window that is capable of adjusting to accurately align with the misfire signal.

SUMMARY OF THE INVENTION

In one aspect of the invention, an engine misfire detector includes a reference window generator that generates a misfire window reference signal having a misfire sampling window. A misfire window calculator is coupled to a condition variable input and the reference window generator. The condition varying input may be a filter input or an input from various engine sensors. The misfire window calculator calculates an offset for adjusting the sampling window in response to the condition variable input.

In a further aspect of the invention, a method for determining misfire of an engine generally comprises the steps of obtaining a reference misfire window signal and adjusting the reference misfire detection window in response to a condition varying input to obtain an adjusted window signal.

One advantage of the invention is that both the window lengths and the relative position of the window may be adjusted based upon the filter type in use, the load, spark, age, or other conditions that may affect the alignment of the misfire signal with respect to the misfire detection window.

Other features of the present invention will become apparent when viewed in light of the detailed description of the preferred embodiment when taken in conjunction with the attached drawings and appended claims.

BRIEF DESCRIPTION OF THE DRAWINGS

FIG. 1 is a block diagram of a misfire detection system in accordance with a preferred embodiment of the present invention.

FIG. 2 is a high level block diagram of the misfire integrated circuit of FIG. 1.

DETAILED DESCRIPTION OF THE PREFERRED EMBODIMENT(S)

Figure 3:
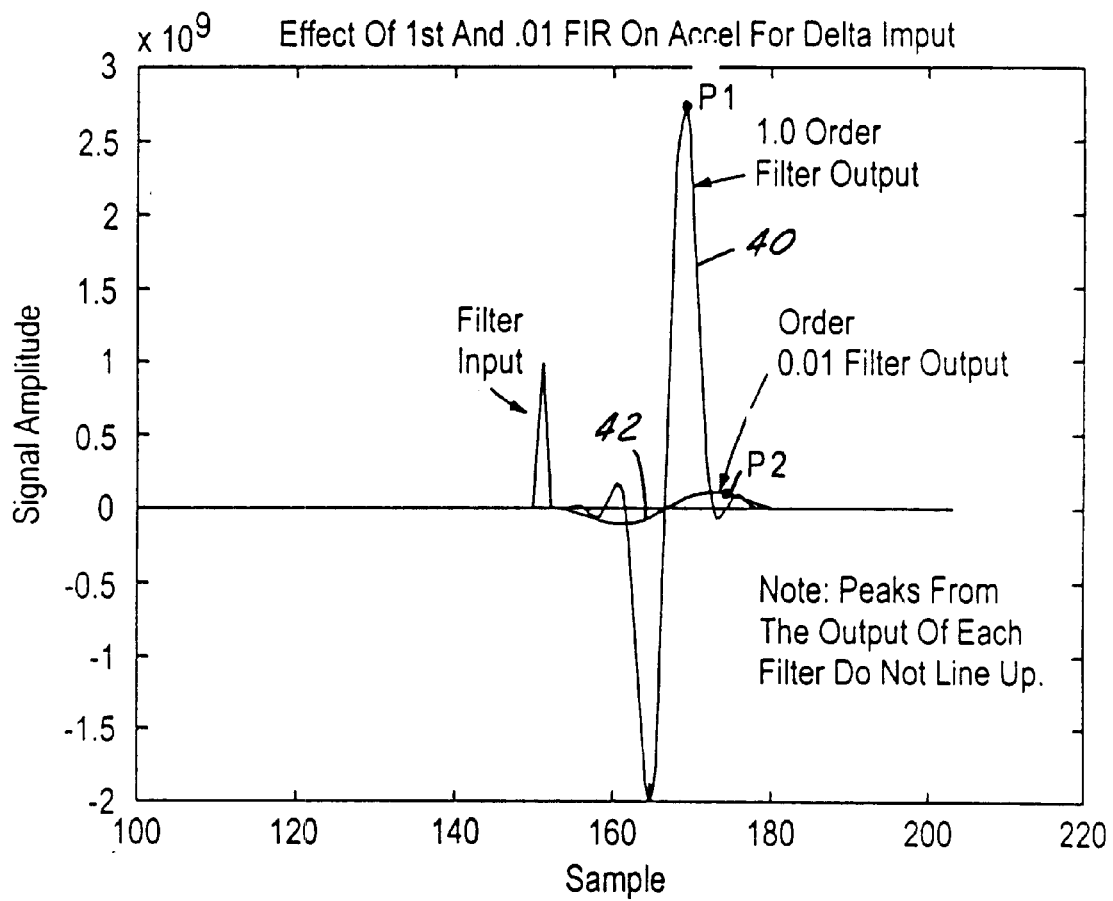
FIG. 3 is a graph of signal amplitude versus samples for two finite impulse response filters.

FIG. 1 is a high level block diagram of a misfire detection system 10 in accordance with a preferred embodiment of the present invention. Misfire detection system 10 includes engine sensors 12 coupled to an engine 14, a powertrain control module microprocessor 16 and a misfire detection integrated circuit (IC) 18. Powertrain control module microprocessor 16 has a number of condition variable inputs and a window calibration input 22. The condition variable inputs may include a filter type in use input 20 and inputs from sensors 12. Sensors 12 may include an engine speed (RPM) sensor 24, a cylinder identification sensor 26, and a crankshaft variable reluctance sensor 28. Sensors 30 represent a variety of other sensors that may be coupled to engine 14. Sensors 30 may, for example, be a load sensor or a spark sensor. The types of sensors may be adjusted based upon the engine type and desired inputs for window length and offset calculations as will be further described below.

Powertrain control module 16 generally controls the operation of engine 14. Feedback is provided to power control module 16 through sensors 12 as to the operation of engine 14. In current misfire detection circuits, the misfire sampling signal parameters such as window size and duty cycle are stored in a memory (not shown) within powertrain control module 16. Powertrain control module 16 generates the sampling signal during operation of the engine. The stored misfire sampling signal in this invention is used as a misfire window reference signal.

Misfire detection IC 18 converts the signal from CVRS sensor 28 into a misfire acceleration signal. The misfire acceleration signal is coupled to the powertrain control module microprocessor 16. A sample of the misfire signal is made during the misfire sampling window. Powertrain control module 16 compares the sample signal to a threshold. If the sample is greater than the threshold, the powertrain control module illuminates a malfunction indicator light 32 in accordance with regulations from various governmental agencies.

RPM sensor 24 may be a profile ignition pick up (PIP) signal derived from the position of the crankshaft. The PIP signal may, for example, be derived from a Hall effect sensor coupled to the engine to detect movement of the crankshaft. A vane device passing through the sensor provides the change in the signal. The PIP signal is a battery square wave voltage that has a 50 percent duty cycle. The leading edge of the PIP signal has a predetermined relationship to the cylinder position. Commonly, the leading edge of the PIP signal occurs at 10 degrees below top dead center of each cylinder.

The crankshaft variable reluctance sensor (CVRS) 28 is coupled adjacent to teeth on a wheel that is coupled directly to the crankshaft of engine 14. The sensor may, for example have a magnet and a pole piece. The sensor receives the magnetic flux from the magnet. The toothed wheel may, for example, have 36 places for teeth with one tooth missing. Each tooth corresponds with 10 degrees of movement of the crankshaft. The magnetic flux changes as the teeth pass by the sensor. The CVRS signal may provide, among other things, an indication of the speed of the rotating crankshaft.

The misfire signal is derived from the CVRS sensor 28. Generally, during misfire, the engine crankshaft speed will briefly be reduced. This slowing engine speed may be monitored by misfire circuit 18 and powertrain control module 16 to determine the presence of a misfire.

Referring now to FIG. 2, a simplified block diagram of misfire detection IC 18 of FIG. 1 is illustrated. It should be understood by those skilled in the art that misfire detection IC 18 may be implemented as a separate component as illustrated in FIG. 1, or may be additional circuitry integrated within powertrain control module 16. Regardless of where the circuitry is located physically, the general method for determining misfire according to the present invention is essentially the same.

Misfire detection IC 18 has a window controller 34. Window controller 34 is coupled to a detection algorithm 36. Window controller 34 calculates an offset for adjusting the sampling window of the misfire reference signal. The offset may include adjustment of the size and relative position of the misfire detection window. At minimum, filter type input 20 may be used to calculate the proper window size and position. The misfire window reference signal may be obtained from powertrain control module 16. The misfire window reference signal may set a generally suitable window size and length. The window calibration is then adjusted or shifted by window controller 34 in accordance with the filter type input 20 or other condition variable inputs from other sensors.

Referring now to FIG. 3, the filter output of a 1.0 order finite impulse response (FIR) filter is illustrated at 40, and the output of a 0.01 order FIR filter is illustrated at 42. As is illustrated, the output of the 1.0 order filter has peak $P_1$, which does not line up with the peak $P_2$ of 0.01 order filter. As described above, the chase delay illustrated by the misalignment of the filter peaks may cause the misfire signal to be misaligned with the misfire window. The shift in the peaks may thus be compensated for in the generation of an adjusted sampling window.

Figure 4:
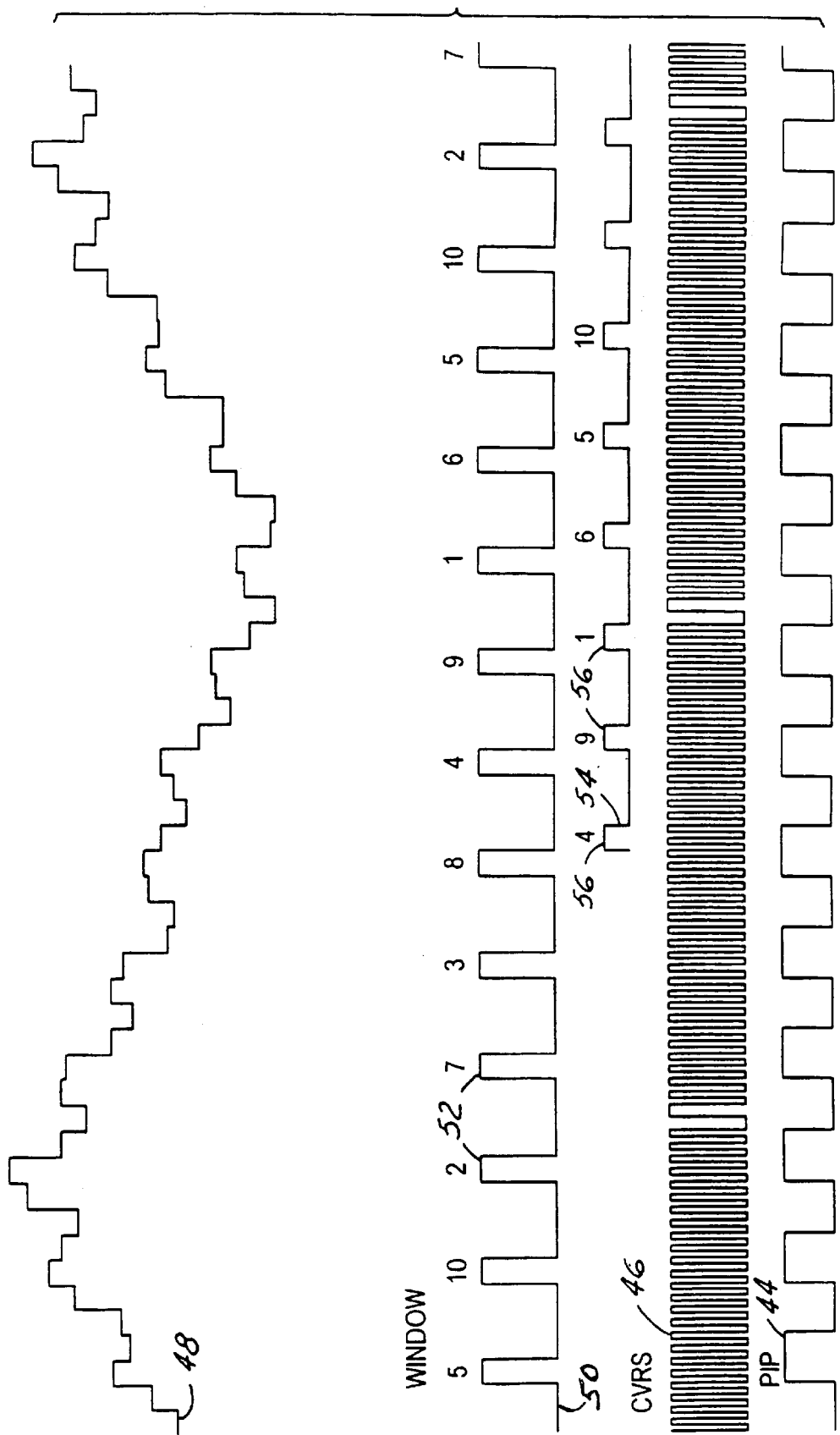
FIG. 4 is a signal timing diagram having various signals including a misfire signal, a reference window signal, an adjusted shifted window signal, a continuous variable reluctance sensor signal, and a PIP signal.

Referring now to FIG. 4, the PIP signal 44 (as described above with respect to FIG. 2) is derived directly from the crankshaft position. The leading edge of PIP signal 44 corresponds to 10 degrees below top dead center of the cylinder for which the PIP signal is associated. The CVRS signal 46 is also derived from the crankshaft as described above.

Misfire signal 48 is derived from the CVRS signal in a conventional manner. The misfire signal is a measure of the acceleration of the crankshaft. When the crankshaft slows due to misfire, the misfire signal will decrease.

The timing of the measurement of the misfire signal for the presence of misfire is important because only one sample is used as the misfire signal for that value. Window signal 50 represents an unshifted window as was commonly used in the prior art or a misfire window reference signal as used in the present invention. The misfire window reference signal 50 has a plurality of windows 52 that correspond, in this example, to when the signal is high. Sampling of misfire signal 48 occurs during sampling window 52. Each sampling window 52 of window signal 50 is supposed to correspond to the particular cylinder. Typically, the lowest value of misfire signal 48 occurring in misfire window 52 is used. Each sampling window 52 of window signal 50 is labeled according to the cylinder number. In this example, a V-10 engine is used for discussion purposes.

From the window signal 50, a shifted window signal 54 may be derived. Shifted window signal 54 is used by detection algorithm 36. Shifted window signal 54 is more accurate than the reference window signal 50 when, for example, the filter used by the signal processing is switched from a 1.0 order filter to a 0.01 order filter. In this example, the window 52 is adjusted by shifting window 52 to window 56. Of course, the duty cycle or length of window 52 may also be adjusted. In this signal illustration, the injector of cylinder six was pulled from the engine causing a misfire. If window signal 50 was used, this minimum value associated with misfire occurs at cylinder one. By switching to shifted window signal 54, the cylinder six sample occurs at cylinder six rather than cylinder one. Thus, by recalculating window size, proper alignment with the misfire event is achieved.

In operation, window controller 34 receives various condition variable inputs that are to be used in a determination of the adjustment of the sampling window position. The reference window calibration 22 may be used by window controller 34 as a reference signal. The CVRS signal transitions may be used as units. Based on the various events measured by various sensors, the window position may be adjusted a particular number of units forward or backward with respect to the misfire signal. For example, when switching from a 1.0 order filter to a 0.01 order filter, a three unit shift may be used. Units corresponds to an amount of crankshaft movement in an engine cycle. For example, on a V-10 engine 18 degrees of rotation corresponds to one unit. Load, spark or other operating conditions may also cause a similar shift in the number of units of shifted window signal 52. For example, one engine parameter may cause a forward shift while others may cause a rearward shift. The proper number of units that each operating parameter may shift shifted window signal 54 may be experimentally determined. Engines with various number cylinders may need to be shifted different amounts. The amount of the change from the various condition varying parameters may also change.

Misfire controller 34 calculates the adjustment of window 52 to obtain window 56. Based upon the sample taken during the high portion of the shifted window, detection algorithm 36 provides an acceleration value indicative of the presence of misfire to powertrain control module microprocessor 16. The acceleration value is compared to a predetermined threshold. When the acceleration value from detection algorithm 36 is greater than the threshold, the powertrain records a misfire. When a sufficient number of misfires are recorded, malfunction indicator light 32 is illuminated to signal the vehicle operator of the presence of an engine fault so that service may be obtained.

As described above, the base misfire window is shifted. However, the duty cycle or the high portion of the signal may also be lengthened (or shortened) according to the input from the condition variable inputs.

While particular embodiments of the invention have been shown and described, numerous variations and alternate embodiments will occur to those skilled in the art. Accordingly, it is intended that the invention be limited only in terms of the appended claims.

What is claimed is:

1. A system for detecting misfire in an internal combustion engine comprising:
    a reference window generator generating a misfire window reference signal having a misfire sampling window;
    a condition variable input;
    a variable order filter circuit having filter-type in use output;
    a misfire generator coupled to and generating a misfire signal in response to said condition variable input; and
    a misfire window size calculator coupled to said condition variable input, said variable order filter circuit, and said reference window generator, said misfire window calculator calculating an offset for adjusting the sampling window for evaluation of said misfire signal in response to the condition variable input and said filter-type in use output.

2. A system for detecting misfire as recited in claim 1 further comprising a misfire detection circuit coupled to said misfire window size calculator, said detection circuit sampling a misfire signal and generating a value indicative of a misfire.

3. A system for detecting misfire as recited in claim 1 wherein said offset includes increasing a window width.

4. A system for detecting misfire as recited in claim 1 wherein said offset includes changing a window position.

5. A system for detecting misfire as recited in claim 1 wherein said condition variable input comprises a load detector.

6. A system for detecting misfire as recited in claim 1 wherein said condition variable input comprises a spark detector.

7. A system for detecting misfire in an internal combustion engine comprising:
    a reference window generator generating a misfire window reference signal having a misfire sampling window;
    an engine position sensor coupled to said engine, said engine position sensor generating a position signal;
    a misfire signal generator coupled to said engine position sensor, said misfire signal generator generating a misfire signal from said position signal;
    a condition variable input;
    a variable order filter circuit having filter-type in use output;
    a misfire window size calculator coupled to said condition variable input and said reference window generator, said misfire window size calculator adjusting the misfire sampling window in response to the condition variable input and said filter-type in use output; and
    a misfire detection circuit coupled to said window size calculator, said detection circuit sampling said misfire signal and generating a misfire value indicative of a misfire.

8. A system for detecting misfire as recited in claim 7 wherein said engine position sensor is a crankshaft position sensor.

9. A system for detecting misfire as recited in claim 7 wherein said misfire window size calculator generates an offset and adjusts said sampling window by said offset in response to said condition variable input, said offset includes changing a window width.

10. A system for detecting misfire as recited in claim 7 wherein said misfire window size calculator generates an offset and adjusts said sampling window by said offset in response to said condition variable input, said offset includes changing said window position.

11. A system for detecting misfire as recited in claim 7 wherein said condition variable input comprises a filter type input.

12. A system for detecting misfire as recited in claim 7 wherein said condition variable input comprises an engine speed detector.

13. A method of detecting misfire in an internal combustion engine comprising the steps of:
    obtaining a reference misfire detection window signal;
    receiving a condition varying input;
    generating a misfire signal in response to said condition varying input;
    providing a variable order filter circuit having filter-type in use output; and
    adjusting the reference misfire detection window in response to the condition varying input and the filter-type in use output to obtain an adjusted window signal for evaluation of said misfire signal.

14. A method of detecting misfire as recited in claim 13 further comprising the steps of calculating an offset amount in response to the condition varying input.

15. A method of detecting misfire as recited in claim 14 wherein the step of calculating the offset amount includes the step of calculating a window shift.

16. A method of detecting misfire as recited in claim 14 wherein the step of calculating the offset amount includes the step of calculating a window length.

17. A method of detecting misfire as recited in claim 13 further comprising the step of continuously performing the steps of receiving and adjusting while operating the engine.

18. A method of detecting misfire as recited in claim 13 further comprising the step of sampling a misfire signal during a shifted window signal to obtain a sample.

19. A method of detecting misfire as recited in claim 18 further comprising the step of comparing the sample to a threshold.

* * * * *